(12) United States Patent
Maruyama et al.

(10) Patent No.: US 8,319,983 B2
(45) Date of Patent: Nov. 27, 2012

(54) IMAGE FORMING DEVICE, IMAGE FORMING DEVICE TERMINAL, IMAGE FORMING SYSTEM, AND PROGRAM FOR CONFIDENTIAL DOCUMENTS

(75) Inventors: Tomoko Maruyama, Toyokawa (JP);
Kazuhiro Tomiyasu, Toyokawa (JP);
Kentaro Nagatani, Toyokawa (JP);
Masahiro Imamura, Toyokawa (JP);
Takeshi Hibino, Toyokawa (JP)

(73) Assignee: Koinca Minolta Business Technologies, Inc., Chiyoda-Ku, Tokyo (JP)

( * ) Notice: Subject to any disclaimer, the term of this patent is extended or adjusted under 35 U.S.C. 154(b) by 989 days.

(21) Appl. No.: 12/332,665

(22) Filed: Dec. 11, 2008

(65) Prior Publication Data

US 2009/0153896 A1 Jun. 18, 2009

(30) Foreign Application Priority Data

Dec. 13, 2007 (JP) ................. 2007-321738

(51) Int. Cl.
*G06K 15/00* (2006.01)
*G06F 3/12* (2006.01)
(52) U.S. Cl. ..................... 358/1.14; 358/1.15
(58) Field of Classification Search .................. None
See application file for complete search history.

(56) References Cited

U.S. PATENT DOCUMENTS

| | | | |
|---|---|---|---|
| 2005/0100378 A1* | 5/2005 | Kimura et al. | 400/76 |
| 2005/0120244 A1* | 6/2005 | Choi | 713/201 |
| 2010/0162000 A1* | 6/2010 | Masui et al. | 713/189 |
| 2011/0249283 A1* | 10/2011 | Okada et al. | 358/1.9 |

FOREIGN PATENT DOCUMENTS

| | | |
|---|---|---|
| JP | 6-183110 A | 7/1994 |
| JP | 2004-001284 | 1/2004 |
| JP | 2005-001155 | 1/2005 |
| JP | 2006-334873 A | 12/2006 |
| JP | 2007-034816 | 2/2007 |
| JP | 2007-148854 | 6/2007 |
| JP | 2007-221579 | 8/2007 |

OTHER PUBLICATIONS

Notification of Reason(s) for Refusal issued in the corresponding Japanese Patent Application No. 2007-321738 dated Oct. 27, 2009, and an English Translation thereof.

\* cited by examiner

*Primary Examiner* — Gabriel Garcia
(74) *Attorney, Agent, or Firm* — Buchanan Ingersoll & Rooney PC

(57) ABSTRACT

The present invention provides an image forming device capable of maintaining a security level of a document constant, and an image forming device terminal. The image forming device capable of executing an authentication print printing includes a storage unit for storing a document data file and setting data of the authentication print printing of the document data file; a communication interface for receiving instruction data containing instruction of a process related to the document data file; an authentication print setting determination unit for determining whether to execute as the authentication print printing based on setting data stored in the storage unit; an authentication unit; a user authentication unit for outputting the result of the user authentication; a job executing unit for executing the job; and an authentication print setting registration unit for editing the setting data stored in the storage unit based on the instruction data.

5 Claims, 13 Drawing Sheets

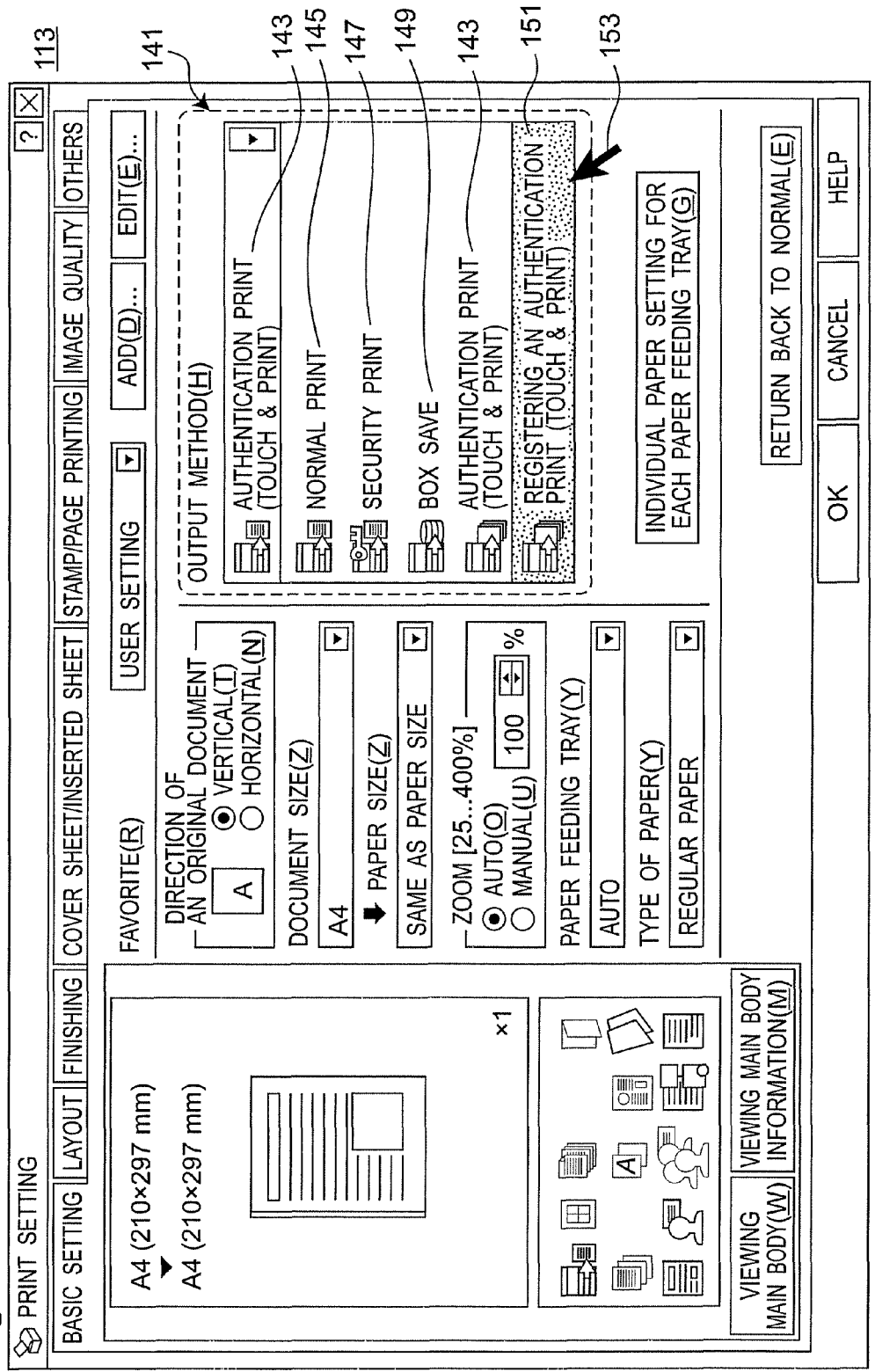

IMAGE FORMING DEVICE, IMAGE FORMING DEVICE TERMINAL, IMAGE FORMING SYSTEM, AND PROGRAM FOR CONFIDENTIAL DOCUMENTS

This application is based on an application No. 2007-321738 filed in Japan, the contents of which are hereby incorporated by reference.

BACKGROUND OF THE INVENTION

1. Field of the Invention

The present invention relates to an image forming device, an image forming device terminal for giving instructions to the image forming device, an image forming system made up of such devices, and a program used in the image forming system, and more particularly, to an image forming device which requests user authentication for the start of printout process, an image forming device terminal (an image formation instructing device) which gives a printout instruction to the image forming device, an image forming system made up of such devices, and a program used in the device making up the image forming system.

2. Description of the Related Art

In recent years, the image forming device is connected to a plurality of information processing devices (image forming device terminals) by way of a network, and is shared by a plurality of users using the plurality of information processing devices. The image forming device is a digital multifunction peripheral (MultiFunction Peripheral (MFP), a Scan Print Copy (SPC), or All In One (AIO)) having at least two or more functions of a printer, a facsimile, a copying machine, a scanner, and the like. The information processing device (image forming device terminal) is a personal computer (PC), or the like. The image forming device and the information processing device are communicably connected to each other by way of a communication network such as Local Area Network (LAN) and the Internet to configure an image forming system. The image forming system can be formed by connecting one image forming device and one information processing device one-to-one in its minimum configuration. Recently, however, a large-scale image forming system is often being built up in which a plurality of image forming devices and a plurality of information processing devices are connected to each other.

When the user attempts to output a printed material of a desired document using the image forming device in such image forming system, the user uses the information processing device to specify the data file of the relevant document saved in the image forming system, select and specify the image forming device to execute the printout of the relevant document from a plurality of image forming devices in the image forming system, and finally, input an instruction to execute the printout to the information processing device.

The information processing device sends job data described with the specified data file and various setting data related to the printout to the specified image forming device. The image forming device that received the job data executes printing based on the job data. The document printed material is discharged from a paper discharge tray of the image forming device. The user then goes to the image forming device and collects the discharged document printed material.

However, the user is not necessarily nearby the image forming device when the document printed material is discharged from the image forming device. Since the image forming device is shared by a plurality of users, another user might be near the image forming device. Thus, a problem of ensuring information security related to the document printed material discharged from the image forming device arises in the image forming system.

JP 6-183110 A discloses a printing device (printer). Such printing device receives print data from a plurality of host computers connected by way of a network, and executes printing based on the received print data. The print data sent to the printer may contain a password. Thus, when receiving the print data from the computer, the printer determines whether or not a password is contained in the received print data. When determined that the received data contains a password, the printer executes the printout based on the received print data only after confirming that the user has correctly input the password through a user interface of the printer.

The printing device disclosed in JP 6-183110 A executes printing when the password given to the print data is matched with the password input by the user. The relevant printing device ensures information security on the information indicated by the print data in this manner.

The technique disclosed in JP 6-183110 A is a technique in which the printing device requests for a password to be input by the user, that is, user authentication as a trigger for defining the start of printout, and is not a technique in which the printing device determines whether or not to perform the user authentication serving as a trigger for defining the start of printout for each printout process.

JP 2006-334873 A discloses an image forming device for executing printing in response to a printing instruction from an external device. When the received printing instruction requests to ensure security, the authentication process related to ensuring of security is performed, and the print data related to the printing instruction is acquired only after the authentication process is successfully completed in the image forming device.

The image forming device disclosed in JP 2006-334873 A thus suppresses the volume of the memory necessary for keeping the print data at low level, and ensures information security on the printing process.

Numerous documents related to information security of the image forming system have already been proposed.

The image forming device for performing user authentication through a predetermined user authentication means arranged in the image forming device at the start of execution of the printout as disclosed in JP 6-183110 A is already widely known. The technical methodology adopted in the technique of JP 6-183110 A is an effective methodology for ensuring the user to be near the image forming device when the image forming device actually executes the printout.

However, it is sometimes bothersome for the user to perform user authentication on the predetermined user authentication means arranged in the image forming device to cause the image forming device to actually start the execution of the printout. Thus, in implementation, only when printing out a document where confidentiality is essential, it is performed to perform user authentication using the predetermined user authentication unit and execute the printout.

If a plurality of users shares a data file of a document, the awareness on the importance of confidentiality regarding the document of the data file tends to differ among the users.

In such case, a certain user sufficiently recognizes the importance of confidentially of the data file, and always performs the printout involving user authentication when printing out the data file. However, another user might perform a normal printout when printing out the same data file. The difference in awareness on the confidentiality of the information of the same document among the plurality of users becomes an obstacle in managing the security of the information.

SUMMARY OF THE INVENTION

In view of the above problem, it is an object of the present invention to provide an image forming device system capable of appropriately and selectively setting whether or not to execute user authentication using a predetermined user authentication means arranged in the image forming device to start the execution of the printout for every document related to each printout job the image forming device receives. The subject invention ensures information security on the printed and discharged document printed material at high level and enhances operability of the user on the image forming device, thereby enhancing the productivity of the image forming process such as printing.

In one aspect of the present invention, the present invention is an image forming device terminal for sending an instruction to an image forming device capable of executing an authentication print printing, which is a printout process of performing user authentication using a predetermined authentication device and determining start of execution of a printout process based on a result of the user authentication. The image forming device terminal includes: a document selection receiving unit which receives a selection of a document data file; an authentication print setting selection receiving unit which receives a selection of whether to have the printout process of the selected document data file as an authentication print printout process or a printout process of not the authentication print printing; an instruction data transmitter which transmits an instruction containing the printout process of the document data file to the image forming device; and an authentication print setting registration transmitter which transmits to the image forming device an instruction containing a process of registering to the image forming device to have the printout process of the document data file as the authentication print printout process based on a content received by the authentication print setting selection receiving unit.

In another aspect of the present invention, the present invention is a computer readable medium storing an image forming device control program executed by a computer of an image forming device terminal for sending an instruction to an image forming device capable of executing an authentication print printing, which is a printout process of performing user authentication using a predetermined authentication device and determining start of execution of a printout process based on a result of the user authentication. The image forming device control program includes: code that receives a selection of a document data file; code that receives a selection of whether to have the printout process of the selected document data file as an authentication print printout process or a printout process of not the authentication print printing; code that transmits an instruction containing the printout process of the document data file to the image forming device; and code that transmits to the image forming device an instruction containing a process of registering to the image forming device to have the printout process of the document data file as the authentication print printout process based on a content received by the code that receives a selection of whether to have the printout process of the selected document data file.

In further aspect of the present invention, the present invention is an image forming device capable of executing an authentication print printing, which is a printout process of performing user authentication using a predetermined authentication device and determining start of execution of the printout based on a result of the user authentication. The image forming device includes: a storage unit which stores a document data file and setting data of the authentication print printing of the document data file; a communication interface which receives instruction data containing an instruction of a process related to the document data file stored in a document box from an image forming device terminal, communicating with the external image forming device terminal; an authentication print setting determination unit which, when the instruction data contains the printout of the document, determines whether to execute the process instructed by the instruction data as the authentication print printing or a normal printout process based on setting data of the authentication print printing stored in the storage unit; an authentication unit which is the predetermined authentication device; a user authentication unit which outputs the result of the user authentication using the authentication unit; a job executing unit which executes the job related to the instruction data based on the result of the user authentication; and an authentication print setting registration unit which edits the setting data of the authentication print printing stored in the storage unit based on the instruction data; wherein, when the instruction data contains data indicating to turn ON the setting of the authentication print printing, the authentication print setting registration unit edits and turns ON the setting data of the authentication print printing of the document.

In still further aspect of the present invention, the present invention is a computer readable medium storing an image forming program executed by a computer of an image forming device capable of executing an authentication print printing, which is a printout process of performing user authentication using a predetermined authentication device and determining start of execution of the printout based on a result of the user authentication. The image forming program includes: code which stores a document data file and setting data of the authentication print printing of the document data file; code which communicates with an external image forming device terminal, and receives instruction data containing instruction of a process related to the document data file stored in a document box from the image forming device terminal; code which determines, when the instruction data contains the printout of the document, whether to execute the process instructed by the instruction data as the authentication print printing or a normal printout process based on the stored setting data of the authentication print printing; code which outputs the result of the user authentication using an authentication unit which is the predetermined authentication device; code which executes a job related to the instruction data based on the result of the user authentication; and code which edits the stored setting data of the authentication print printing based on the instruction data, wherein, when the instruction data contains data indicating to turn ON the setting of the authentication print printing, the code that edits the stored setting data edits and turns ON the setting data of the authentication print printing of the document.

The present invention provides: an image forming device for performing printout based on job data sent from an information processing device; an image forming device terminal; an image forming system; or a program used therein. The image forming device is capable of appropriately determining whether or not to execute user authentication using a predetermined user authentication means arranged in the image forming device at the start of execution of the printout of a document related to a job that the image forming device has received. When the image forming device etc. according to the present invention determines that the user authentication is necessary from the standpoint of ensuring information security based on a predetermined parameter, the image forming device automatically changes the setting to request the user authentication to the user at the start of execution of the printout. Thus, the information security related to the printout is sufficiently ensured in the present invention. Therefore, the image forming device etc. of the present invention sufficiently ensures information security of the document printed material that is printed out, and enhances the operability of the user on the image forming device etc., thereby enhancing the productivity of the image forming process.

Other objects and further features of the present invention will be apparent from the following detailed description when read in conjunction with the accompanying drawings.

BRIEF DESCRIPTION OF THE DRAWINGS

FIG. 13 is a display example of a display 113.

DETAILED DESCRIPTION OF THE PREFERRED EMBODIMENTS

Figure 1:
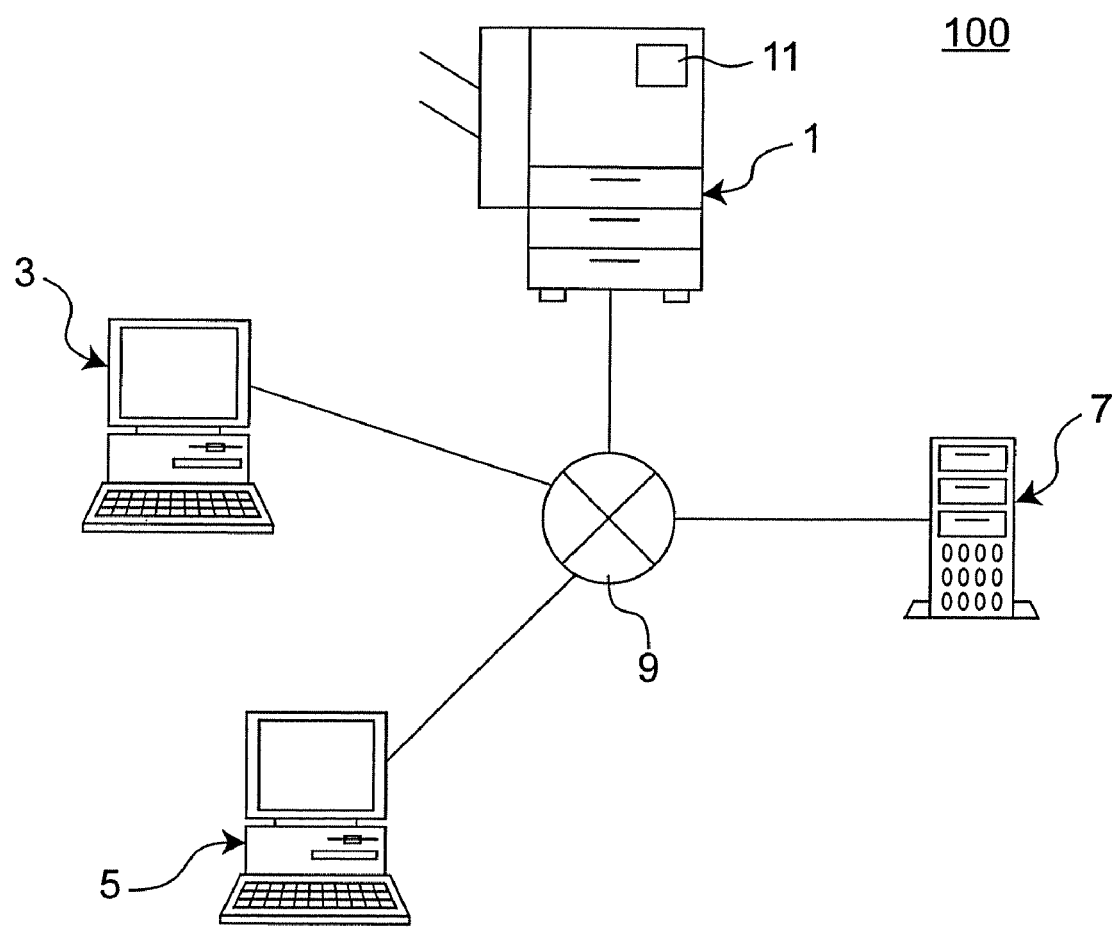
FIG. 1 is a configuration diagram of an image forming system according to an embodiment of the present invention.

The present embodiment relates to an image forming device, an image forming device terminal, an image forming system including such devices, and a program executed in one of the devices configuring the image forming system.

The image forming device according to the present embodiment is an image forming device capable of executing "authentication print (authentication & print)" printout process, to be hereinafter described. Furthermore, the image forming device according to the present embodiment is an image forming device capable of executing the printout process by appropriately switching between the "authentication print" printout process and a normal printout process for a job to be executed. Such switching is automatically executed by the image forming device based on information contained in the job data and/or information appropriately acquired by the image forming device.

The image forming device terminal can generate the job data. Therefore, the switching can be set in the image forming device terminal. In this case, the image forming device references the switch setting set by the image forming device terminal and executes the printout by automatically switching between the "authentication print" printout process and the normal printout process.

In addition, in the image forming system according to the present embodiment, a user can specify a document stored in one of the devices of the image forming system using the image forming device terminal, and stores the setting of "authentication print" with respect to the printout process of the document in the image forming device. This operation can be executed by any user.

In the image forming device etc. according to the present embodiment, the image forming device can, even when a certain user forgets to turn "ON" the "authentication print" printout setting, make a determination on the necessity to execute the "authentication print" printout setting as to the printout process of a predetermined document, and automatically turns ON the "authentication print" printout of the printout process if the image forming device determines that it is necessary to turn ON the "authentication print", and then executes the printout.

Thus, in the image forming system according to the present embodiment, even in a case where the device is normally operated with the setting of the "authentication print" printout turned "OFF" so that user's operability and productivity of the image forming device etc. should be prioritized, if the device configuring the image forming system determines to execute the printout as "authentication print" printout process in terms of ensuring information security, switch is automatically made to the "authentication print" printout and the printout executed. Therefore, the security level as to the document is maintained constant among a plurality of users while ensuring convenience and productivity of the image forming process in the image forming process using the image forming system of the present embodiment.

<Regarding "Authentication Print (Authentication & Print)" Printout Process>

The "authentication print (authentication & print)" printout process will be briefly described before specifically describing the embodiment of the present invention. The "authentication (&) print" printing refers to a printout mode, when the image forming device executes the job involving the printout process, of when the image forming device performs user authentication using a predetermined authentication means, and starts the printout on the job only when the user authentication is successful. In other words, in the authentication print printout, the image forming device does not immediately execute the printout even when receiving the job. Instead, the image forming device holds the data related to the printout until confirming that the user authentication using the predetermined authentication means is successful, and starts the execution of the printout after confirming that the user authentication is successful. The user authentication herein is a user authentication on the user who has input the job. The authentication print is also referred to as "Touch & Print".

In the "normal" printout process, the image forming device immediately executes the printout on the job when receiving the job. The authentication print printout process differs from the normal printout process in that the printout does not start until the user authentication using the predetermined authentication means is successful.

The preferred embodiments of the present invention will now be described with reference to the accompanied drawings.

FIG. 1 is a schematic diagram of a configuration of an image forming system 100 according to an embodiment of the present invention.

The image forming system 100 includes a digital multi-functional peripheral (MFP) 1 serving as an image forming device, and a plurality of personal computers (PC) 3, 5 serving as an image forming device terminal. The MFP 1 and the plurality of PC 3, 5 are communicably connected by way of a network 9.

The digital multifunction peripheral 1 configures an image forming device according to the present embodiment. The digital multifunction peripheral (MFP) is an image forming device collectively having plural functions such as print function, copy function, scanner function, facsimile function, e-mail transmission function, and the like. However, the image forming device according to the present embodiment merely needs to be an image forming device capable of receiving the job data transmitted from the image forming device terminal via the network, and executing the printout process based on the relevant job data. The MFP 1 is also equipped with an authentication unit 11 serving as a predetermined authentication means for performing user authentication in the authentication print printout process. The authentication unit 11 does not necessarily need to be built in the body of the MFP 1. The authentication unit 11 merely needs to be connected to the MFP 1, and arranged proximate thereto.

Each personal computer 3, 5 executes the image forming device control program according to the present embodiment to configure an image forming device terminal (information processing device) according to the present embodiment. The image forming device terminal according to the present embodiment does not need to be an information processing device having versatility such as a personal computer. The image forming device terminal according to the present embodiment can be realized simply with a device capable of instructing printout of the document to the image forming device. The image forming device control program may be installed in advance in the image forming device terminal. Alternatively, the image forming device control program may be provided to the information processing device through a storage medium such as a flexible disc (FD) or an optical disc, or through a communication function such as the Internet.

The image forming system 100 may also include a server device 7.

The server device 7 is an MFP 1 authentication server. The authentication server is a server having a function of comparing user identifying information (e.g., user ID) and user authentication information (e.g., password, authentication data) both of which are sent from a client (e.g., MFP 1 and PC 3, 5) with user information and user authentication information held in the device, determining success/fail of the user authentication, and returning the determination result to the client.

The server device 7 may also be a data server. The data server 7 is a server that holds data file of a document and data of the job (job data) to be transmitted to the MFP 1, and transmits the data file of the document and the job data in response to a request from the outside. The data server 7 according to the present embodiment can also hold authentication print setting for the document.

However, the server 7 is not an essential element in the image forming system 100. The MFP 1 and PC 3, 5 configuring the image forming system may be provided with the function of the server as necessary. The image forming system may include a plurality of image forming devices.

<Hardware Configuration of the Image Forming Device>

Figure 2:
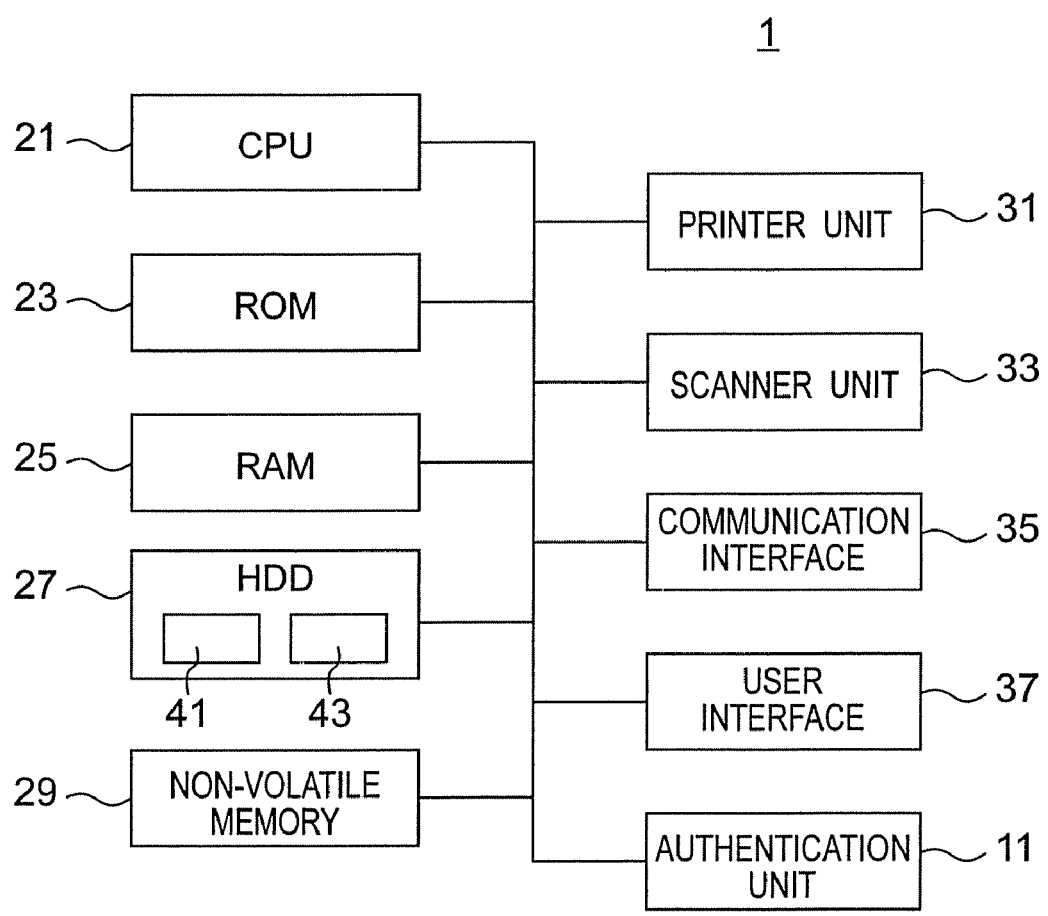
FIG. 2 is a hardware configuration diagram of an image forming device according to an embodiment of the present invention.

FIG. 2 is a block diagram showing a hardware configuration of the MFP 1.

The MFP 1 includes a central processing unit (CPU) 21, a read-only memory (ROM) 23, a random access memory (RAM) 25, a hard disc drive (HDD) 27, a non-volatile memory 29, a printer unit 31, a scanner unit 33, a communication interface 35, a user interface 37, and the authentication unit 11, which are connected to each other using a data bus.

The CPU 21 executes an image forming program held in the ROM 23, the RAM 25, or the HDD 27, or executes an image forming program provided via the communication interface 35, so as to process the data held in the ROM 23, the RAM 25, or the HDD 27. The CPU 21 configures a control unit etc. of the MFP 1 (image forming device) by executing such programs, and realizes the function of the image forming device of the present embodiment. The image forming program may be installed in advance in the image forming device. Alternatively, the image forming program may be provided to the image forming device by way of a storage medium such as a flexible disc (FD) or an optical disc, or through a communication function such as the Internet.

The ROM 23, the RAM 25, the HDD 27, and the non-volatile memory 29 are storage devices that hold data and programs. The MFP 1 appropriately and suitably uses such storage device groups, and holds the data and the programs that need to be held. For instance, the HDD 27 includes a document box 41 for storing a document data file, and a document information database 43 for storing information related to the document data file stored in a device of the image forming system 100 (e.g., PC 3, 5, server 7) other than the MFP 1.

The printer unit 35 executes printout based on the data of the document, and outputs a document printed material printed on a paper medium etc.

The scanner unit 33 photoelectrically reads the information recorded on the paper medium etc., and generates image data of the relevant information.

The communication interface 35 is an interface for performing transmission and reception of data between the MFP 1 and an external device.

The user interface 37 is an operation unit for performing provision and reception of information with the user. The user interface 37 includes a display unit for presenting the information to the user and an input unit for receiving information from the user. The user interface 37 may be obtained by integrally configuring the display unit and the input unit using a liquid crystal touch panel. The user interface 37 may be used as a predetermined authentication means for the authentication print printout process. The user can input information necessary for the user authentication using the user interface 37.

The authentication unit 11 is an information input device used in the user authentication for starting the execution of the printout in the authentication print printout process. The authentication unit 11 may be a biometric authentication unit and the like. The authentication unit 11 may also be an IC card reader for reading information recorded on an IC card possessed by the user. The authentication unit 11 is unnecessary when executing the user authentication using a password input by the user. In this case, the user authentication is executed when the user inputs a password etc. using the user interface 37.

<Functional Configuration of the Image Forming Device>

Figure 3:
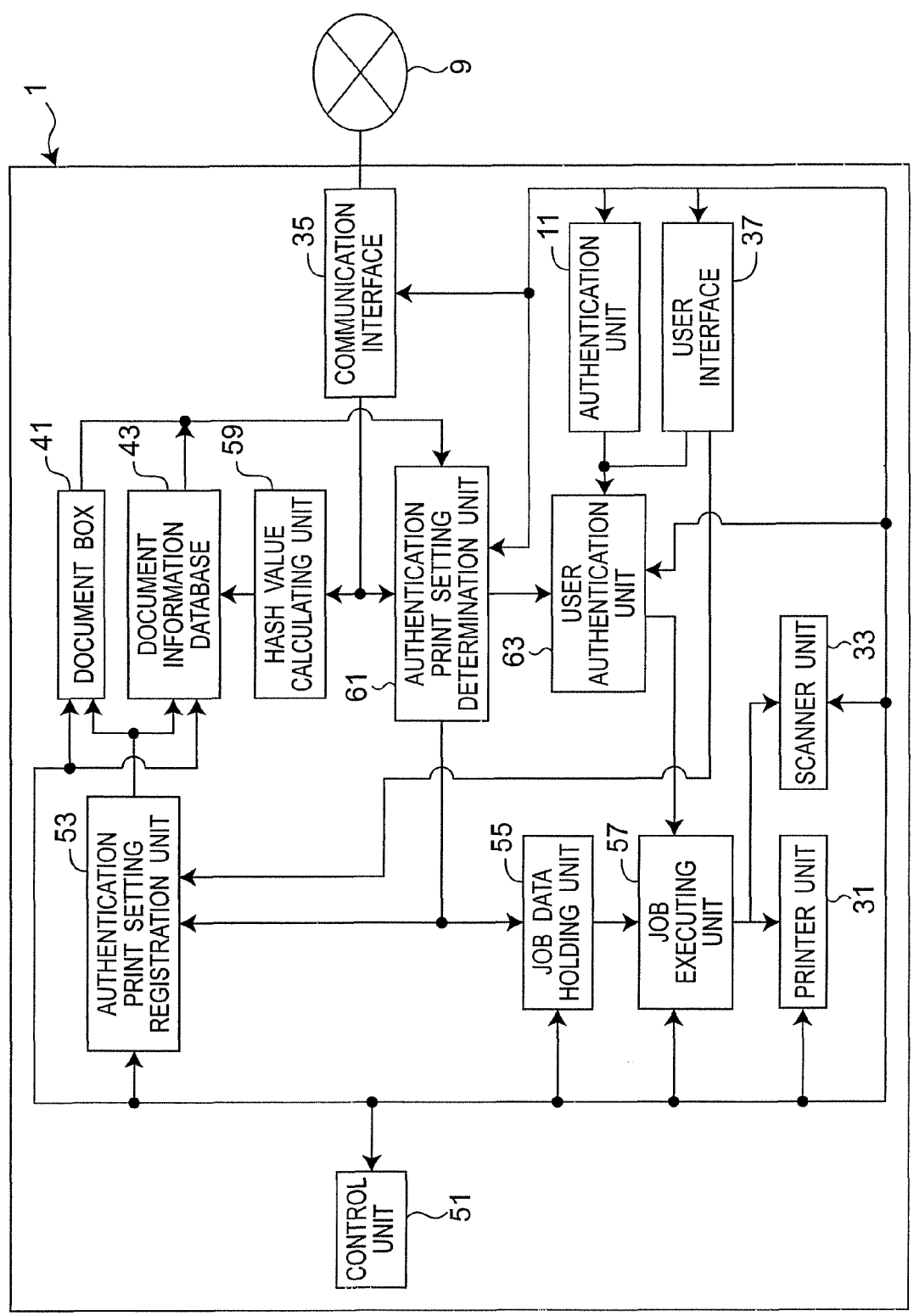
FIG. 3 is a block diagram of a functional configuration of the image forming device.

FIG. 3 is a block diagram of the configuration of the MFP 1 using functional blocks. Functions of the MFP 1 not related to the present embodiment are not illustrated.

The MFP 1 includes a control unit 121. The control unit 121 is realized when the CPU 21 (FIG. 2) executes the image forming program of the present embodiment, as described above. The control unit 121 is connected to each block of the MFP 1 to enable transmission and reception of the data therewith, and recognizes the state of each block to appropriately control the operation of each block.

The communication interface 27 receives job data or authentication print setting registration data, to be hereinafter described, via the network 5. In the case of print job data, the job data contains print attribute data including data related to various settings etc., and document data (document/image data). The print attribute data contains data related to ON/OFF of the authentication print printout process. The data related to ON/OFF of the authentication print printout process is referred to as authentication print setting flag herein. The flag may take a binary value of True/False. "True" corresponds to "ON" of the authentication print setting, and "False" corresponds to "OFF" of the authentication print setting. The job data is sent to an authentication print setting determination unit 61 and a hash value calculating unit 59.

The hash value calculating unit 59 calculates a hash value of an image of the document data contained in the job data, and outputs the hash value to the document information database 43. In the present embodiment, the value output by the hash value calculating unit 59 is not limited to a hash value. The value output by the hash value calculating unit 59 merely needs to be a value derived from the image of the document data.

The authentication print setting determination unit 61 determines ON/OFF of the authentication print setting of the print job related to the received job data. Specifically, the authentication print setting determination unit 61 inquires the authentication print setting of the document used in the print job related to the job data to an authentication print setting registering unit 53 using document managing number uniquely given to each document, identification information given to the document, and the like contained in the received job data in the image forming system 100.

If the data file of the document is stored in the document box 41 of the MFP 1, the authentication print setting registering unit 53 inquires the authentication print setting of the relevant data file to the document box 41. The authentication print setting determination unit 61 then acquires information about the authentication print setting of the relevant data file stored in the document box 41. The authentication print setting registering unit 53 determines the authentication print setting of the print job related to the job data based on the acquired information.

If the data file of the document is stored in a device of the image forming system 100 other than the MFP 1, the authentication print setting registering unit 53 inquires the authentication print setting of the relevant data file to the document information database 43. The authentication print setting determination unit 61 acquires information related to the authentication print setting of the data file stored in the document information database 43. The authentication print setting registering unit 53 determines the authentication print setting of the print job related to the job data based on the acquired information. The document information database 43 may output to the authentication print setting determination unit 61, information related to the authentication print setting on the document registered with a hash value same as the value output by the hash value calculating unit 59 based on the value output by the hash value calculating unit 59. The document information database 43 will be hereinafter described in detail.

The result of the determination is recorded as "True" (corresponding to "ON")/"False" (corresponding to "OFF") in the authentication print setting flag, which is a parameter which can be recorded in the job data.

When receiving the print job of which authentication print setting is set to ON, the authentication print setting registering unit 53 sets the authentication print setting of the document information of the document used in the job stored in the document box 41 or the document information database 43 to ON.

Furthermore, when receiving the authentication print setting registration data of which authentication print setting is set to ON, the authentication print setting registering unit 53 sets the authentication print setting of the document information of the document serving as a target of the authentication print setting registration data stored in the document box 41 or the document information database 43 to ON. The authentication print setting registration data will be described in the section "<Functional configuration of the image forming device terminal>".

The job data holding unit 55 temporarily holds the data related to the printout job (e.g., job data containing data of the document to be printed) of which authentication print setting (authentication print process setting) is set to "ON" until user authentication is successfully completed. The job data holding unit 55 receives the job data from the authentication print setting determination unit 61, temporarily holds the job data, and sends the job data to a job executing unit 57. The job data holding unit 55 holds the job data of which authentication print setting flag is "True".

The job executing unit 57 executes the job based on the received job data. However, regarding the job of which authentication print setting is set to "ON", the job of the user related to the user authentication (e.g., printout) does not start until when the determination result of the user authentication output by the user authentication unit 63 is "success".

The user authentication unit 63 performs user authentication using the authentication unit 11, the user interface 37, and the like in a case where the authentication print setting of the job data is set to "ON", and outputs the determination result of the user authentication. The authentication is performed by transmitting the information input through the authentication unit 11 and the like to the authentication server 7 (FIG. 1) to ask the authentication server 7 to perform the authentication, and receiving the result of authentication from the authentication server 7. Alternatively, information necessary for the user authentication may be provided in the MFP 1 in advance, and the user authentication may be completed only in the MFP 1.

Figure 4:
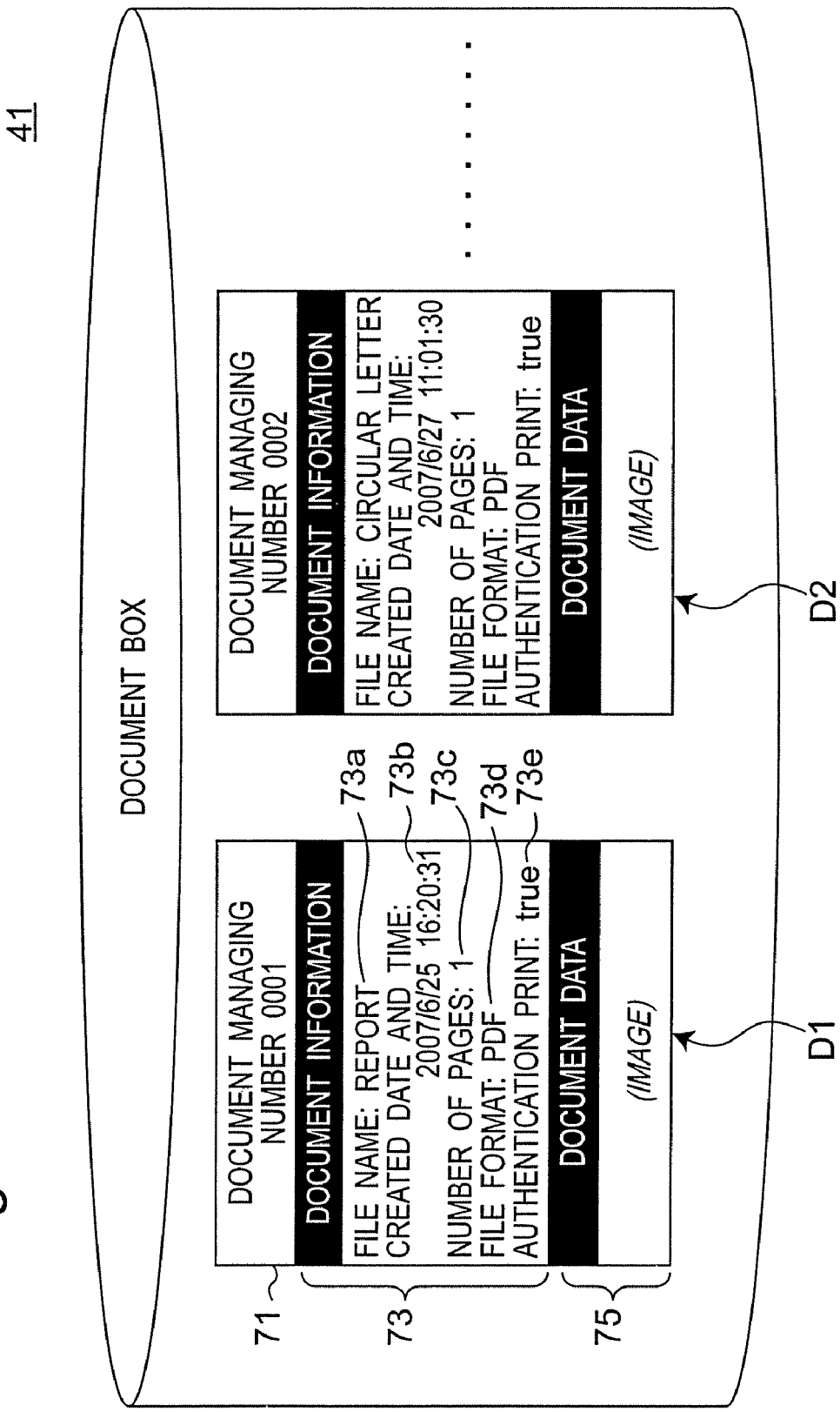
FIG. 4 is a schematic diagram of a configuration of data stored in a document box.

FIG. 4 is a schematic diagram of a data structure of a document stored in the document box 41.

Each document D1, D2 is given a unique document managing number 71. The information on the document is stored in the document information 73. The document information 73 includes a file name 73a of the document, a created date and time 73b of the data file of the document, a number of pages (document pages) 73c of the document, and a file format 73d of the document. The document information 73 also includes a setting flag 73e of the authentication print printout with respect to the document. Such information configures the attribute information of the document. The entity of the document is held as document data 75.

Figure 5:
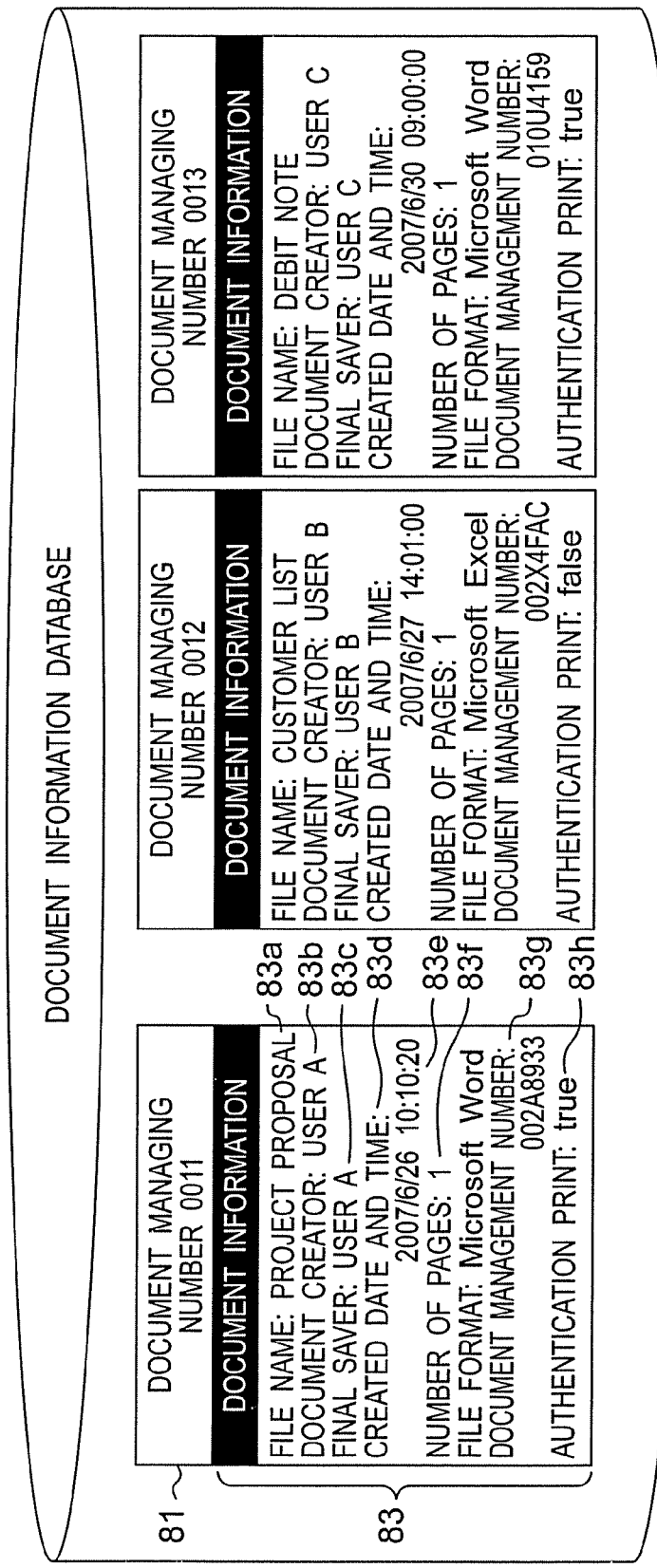
FIG. 5 is a schematic diagram of a configuration of data stored in a document information database.

FIG. 5 is a schematic diagram of a data structure of information on the document stored in the document information database 43.

Information on the document has a unique document managing number 81, and the entity of the information on the document is stored in the document information 83. The document information 83 includes a file name 83*a* of the document, a creator 83*b* of the document, a final saver 83*c* of the document, a created date and time 83*d* of the data file of the document, a number of pages (document pages) 83*e* of the document, a file format 83*f* of the document, and a management number 83*g* of the document in the data server 7 and the like of the image forming system 100, and also includes a setting flag 83*h* of the authentication print printout with respect to the document. Such information configures the attribute information of the document.

<Hardware Configuration of the Image Forming Device Terminal>

Figure 6:
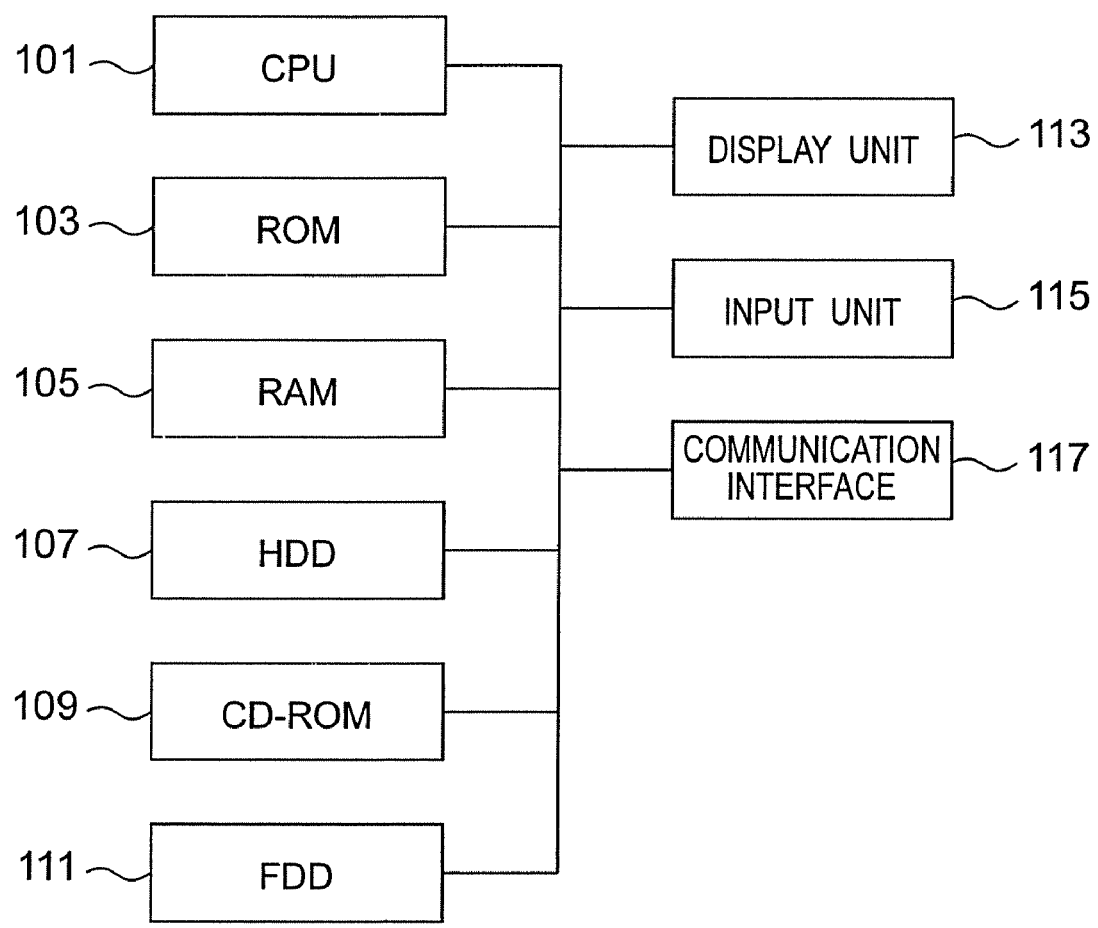
FIG. 6 is a hardware configuration diagram of an image forming device terminal according to the embodiment of the present invention.

FIG. 6 is a block diagram of a hardware configuration of the PC 3.

The PC 3 may be a general personal computer. As well-known, the PC 3 includes a central processing unit (CPU) 101, a read-only memory (ROM) 103, a random access memory (RAM) 105, a hard disc drive (HDD) 107, a compact disc-ROM drive (CD-ROM drive) 109, a flexible disc drive (FDD) 111, a display unit 113, an input unit (keyboard, mouse, etc.) 115, and a communication interface 117, which are connected to each other using a data bus.

The CPU 101 executes an image forming device control program held in the ROM 103, the RAM 105, the HDD 107, the CD-ROM drive 109, or the FDD 111, or the image forming device control program provided via the communication interface 117, and processes the data held in the RAM 105, the HDD 107, and the like. The CPU 101 configures the control unit etc. of the PC 3 (image forming device terminal) by executing such programs, and realizes the image forming device terminal of the present embodiment.

The ROM 103, the RAM 105, the HDD 107, the CD-ROM drive 109, and the FDD 111 are storage devices that hold data and programs. The PC 3 appropriately and suitably uses such storage device groups, and holds the data that need to be held.

The display unit 113 is a display device. The display unit 113 displays information necessary for operating the MFP 1 etc. to the user.

The input unit 115 is a keyboard, a mouse, or the like. The user inputs information necessary for operating the MFP 1 etc. to the PC 3 using the input unit 115.

The communication interface 117 is an interface for performing transmission and reception of data between the PC 3 and an external device.

<Functional Configuration of the Image Forming Device Terminal>

Figure 7:
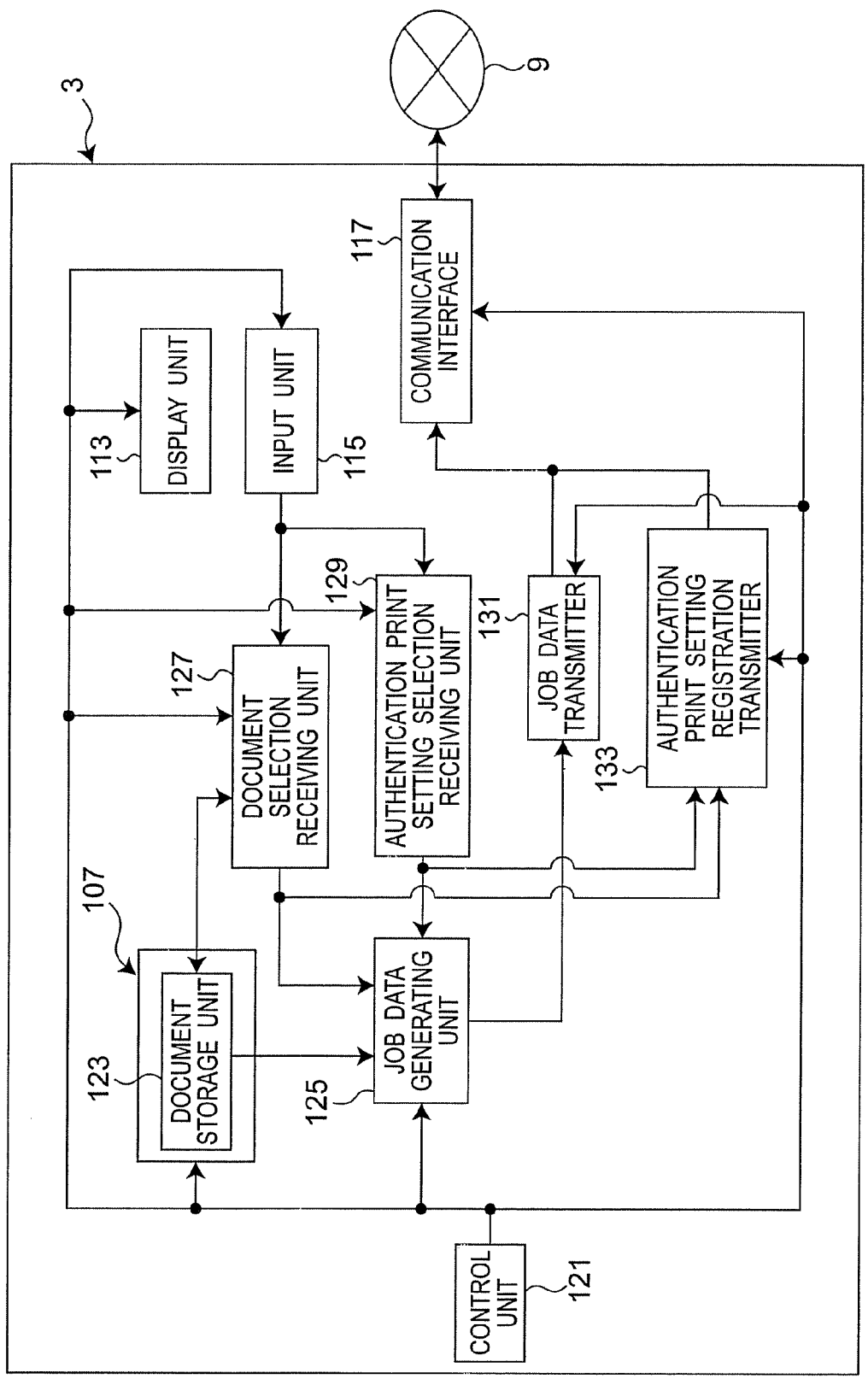
FIG. 7 is a block diagram of a functional configuration of the image forming device terminal.

FIG. 7 is a block diagram of the configuration of the PC 3 using functional blocks. Functions of the PC 3 not related to the present embodiment are not illustrated.

The PC 3 includes the control unit 121. The control unit 121 is realized when the CPU 101 (FIG. 6) executes the image forming device control program of the present embodiment, as described above. The control unit 121 is connected to each block of the PC 3 to enable transmission and reception of the data therewith, and recognizes the state of each block to appropriately control the operation of each block.

A document selection receiving unit 127 receives the selection of the document to be used in the print job, which is input through the input unit 115 by the user. That is, the user selects a document to be used in the print job through the input unit 115. The document selection receiving unit 127 sends information of the selected document to a job data generating unit 125.

The document used in the job may be a data file of the document stored in the document storage unit 123 of the HDD 107 of the PC3. Alternatively, the document used in the job may be a data file of the document held in the data server 7, and the like.

The authentication print setting selection receiving unit 129 receives the selection of the authentication print setting on the document input through the input unit 115 by the user. That is, the user selects the setting of the authentication print through the input unit 115. The authentication print setting selection receiving unit 129 sends the information (information of authentication print setting flag) of ON/OFF selection of the authentication print setting of the document related to the execution of the job to the job data generating unit 125.

The job data generating unit 125 generates the job data. The job data may contain job attribute data including data indicating the attributes of the job, and the data (document information and document data) of the document to be used in the execution of the job. The job data may also contain authentication print setting flag generated based on the information received from the authentication print setting selection receiving unit 129. The job data generating unit 125 creates the job attribute data, and generates the job data with the data file of the document stored in the HDD 107 etc., the document information, and the created job attribute data.

The job data generated in the job data generating unit 125 is sent to the selected image forming device (e.g., MFP 1) via the communication interface 117. The selected image forming device receives the job data, and executes the authentication print printout or the normal printout according to the parameter of the authentication print setting contained in the job attribute data of the job data.

The PC 3 includes an authentication print setting registration transmitter 133 which provides the MFP 1 with information about the authentication print setting as to a document by transmitting authentication print setting registration data so that the MFP 1 can store the setting of the authentication print setting as to this document.

The authentication print setting registration transmitter 133 transmits information (authentication print setting registration data) related to the authentication print setting of the document selected by the user to the MFP 1, similar to when creating the job data.

The transmitted authentication print setting registration data is processed by the MFP 1, and recorded in the authentication print setting 73*e* or 83*h* of the document information 73 or 83 stored in the document box 41 or the document information database 43.

The PC 3 thus can transmit only the authentication print setting as to a document as authentication print setting registration data apart from the job data for causing the MFP 1 to execute the print job. Therefore, even users other than the user for executing the job can register the authentication print setting on the document in the MFP 1. The security management of the document thus becomes possible.

<Image Forming Process Flow>

The flow of process in the image forming device terminal in a case where the user instructs the printout using the image forming device of the image forming system at the image forming device terminal of the present embodiment will be described.

Figure 8:
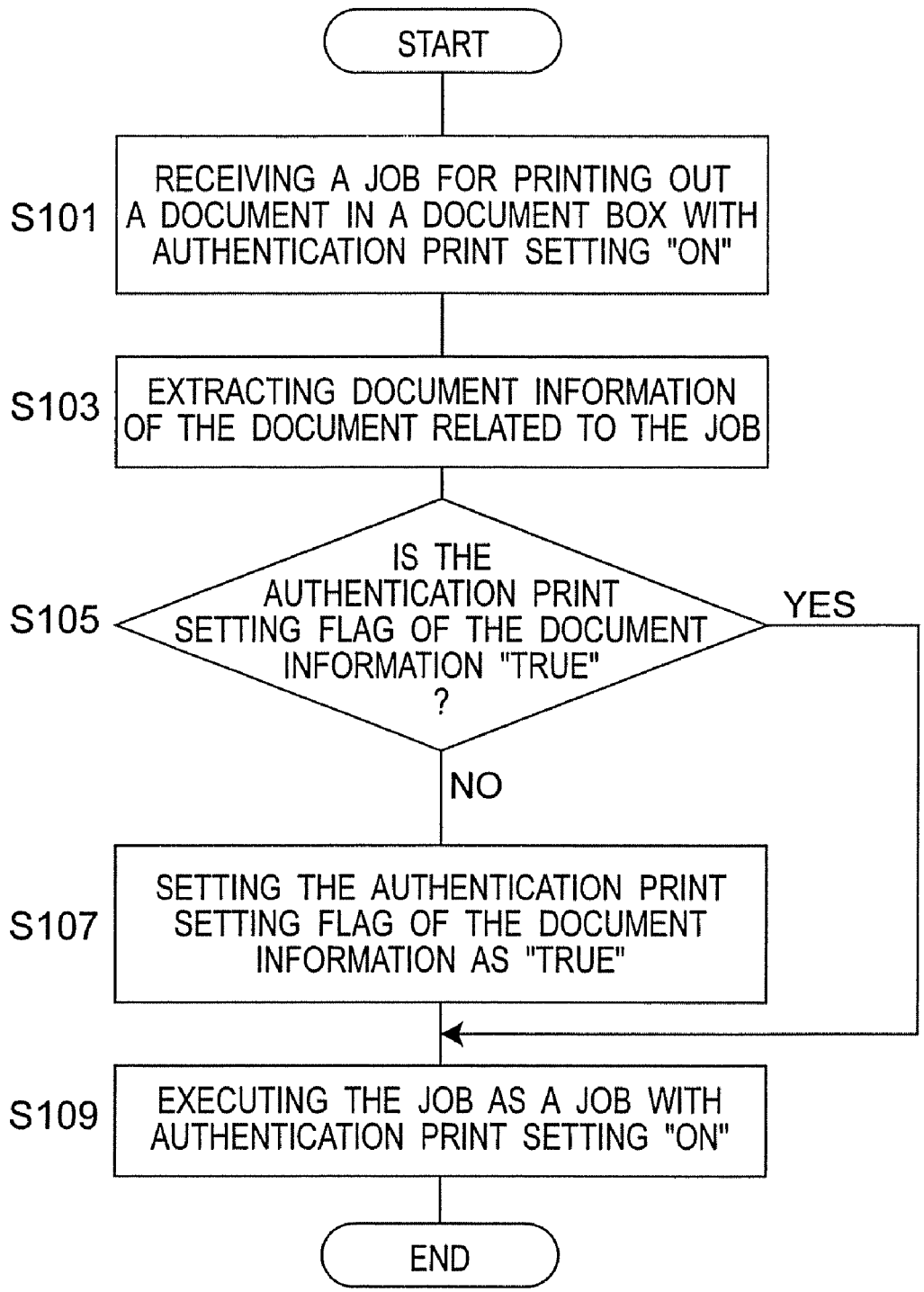
FIG. 8 is a flowchart of process in the image forming device.

FIG. 8 is a flowchart of processes of the MFP 1 in a case where the user selects ON setting in the setting of the authentication print printing at the PC 3, and inputs the job for printing out a document stored in the document box 41 of the MFP 1.

In step S101, the authentication print setting determination unit 61 of the MFP 1 receives the job data through the communication interface 35.

In step S103, the MFP 1 extracts document information of the document stored in the document box 41, which specified in the job data.

In step S105, the MFP 1 determines whether the authentication print setting in the document information as to the document in the document box 41 is recorded as ON setting or as OFF setting. The process proceeds to step S109 if the authentication print setting of the document information as to the document in the document box 41 is recorded as ON setting ("YES" in step S105). The process proceeds to step S107 if the authentication print setting of the document information as to the document in the document box 41 is recorded as OFF setting ("NO" in step S105).

In step S107, the authentication print setting registering unit 53 of the MFP 1 again records the authentication print setting in the document information as ON setting (record the authentication print setting flag as "True").

In step S109, the MFP 1 executes the authentication print printout process as to the document stored in the document box 41, which is specified in the job data.

Figure 9:
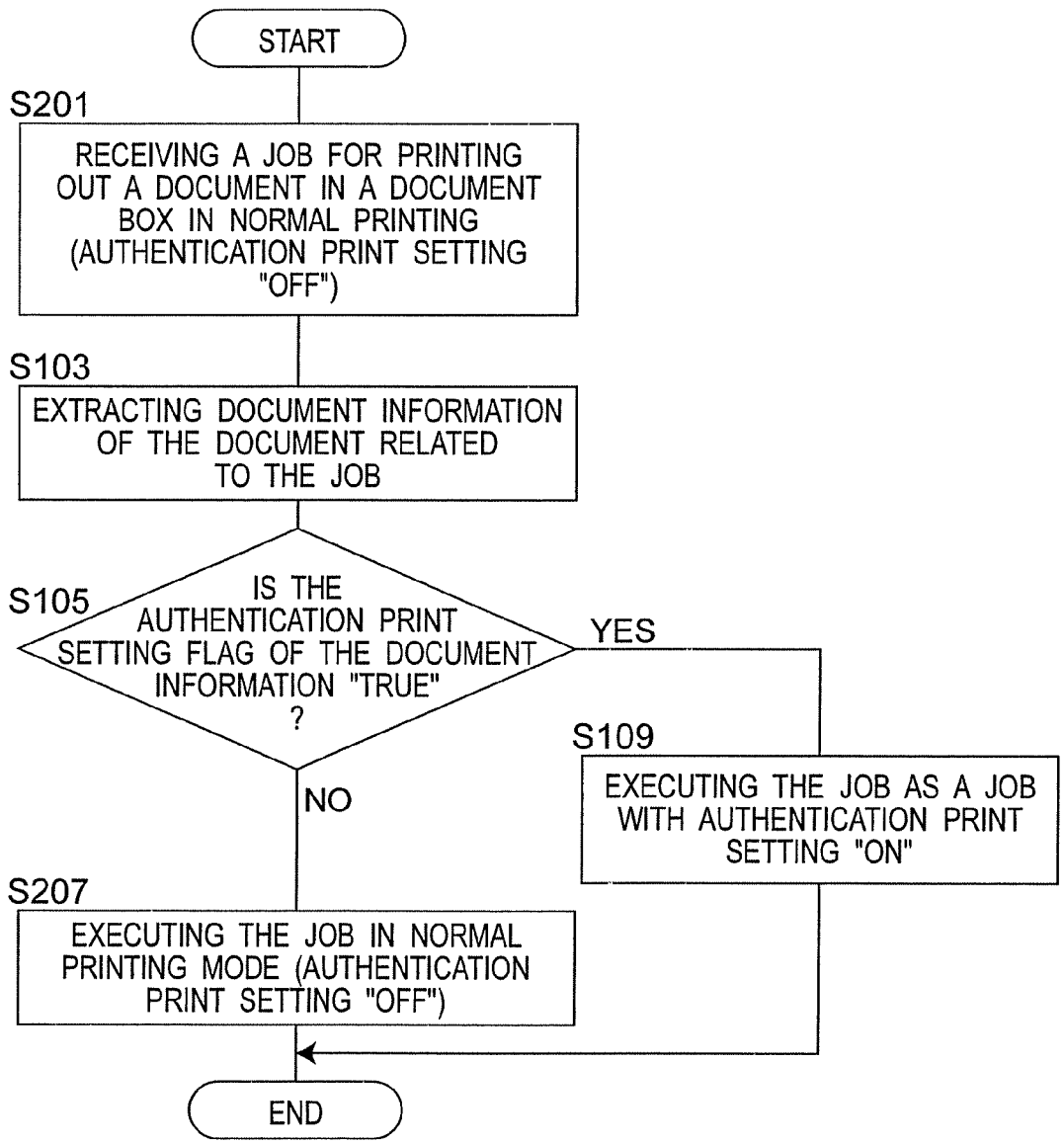
FIG. 9 is a flowchart of process in the image forming device.

FIG. 9 is a flowchart of processes performed by the MFP 1 when the user selects OFF setting for the setting of the authentication print printing at the PC 3, and inputs the job for printing out a document stored in the document box 41 of the MFP 1.

In step S201, the authentication print setting determination unit 61 of the MFP 1 receives the job data through the communication interface 35.

In step S203, the MFP 1 extracts document information as to the document stored in the document box 41, which is specified in the job data.

In step S205, the MFP 1 determines whether the authentication print setting in the document information as to the document stored in the document box 41 is recorded as ON setting or as OFF setting. The process proceeds to step S109 if the authentication print setting of the document information as to the document stored in the document box 41 is recorded as ON setting ("YES" in step S205). The process proceeds to step S207 if the authentication print setting of the document information as to the document stored in the document box 41 is recorded as OFF setting ("NO" in step S205).

The process in step S109 is the same as step S109 described with reference to FIG. 8.

In step S207, the MFP 1 executes the printout process ("normal printing"), which is not the authentication print printout process, on the document stored in the document box 41, which is specified in the job data.

Figure 10:
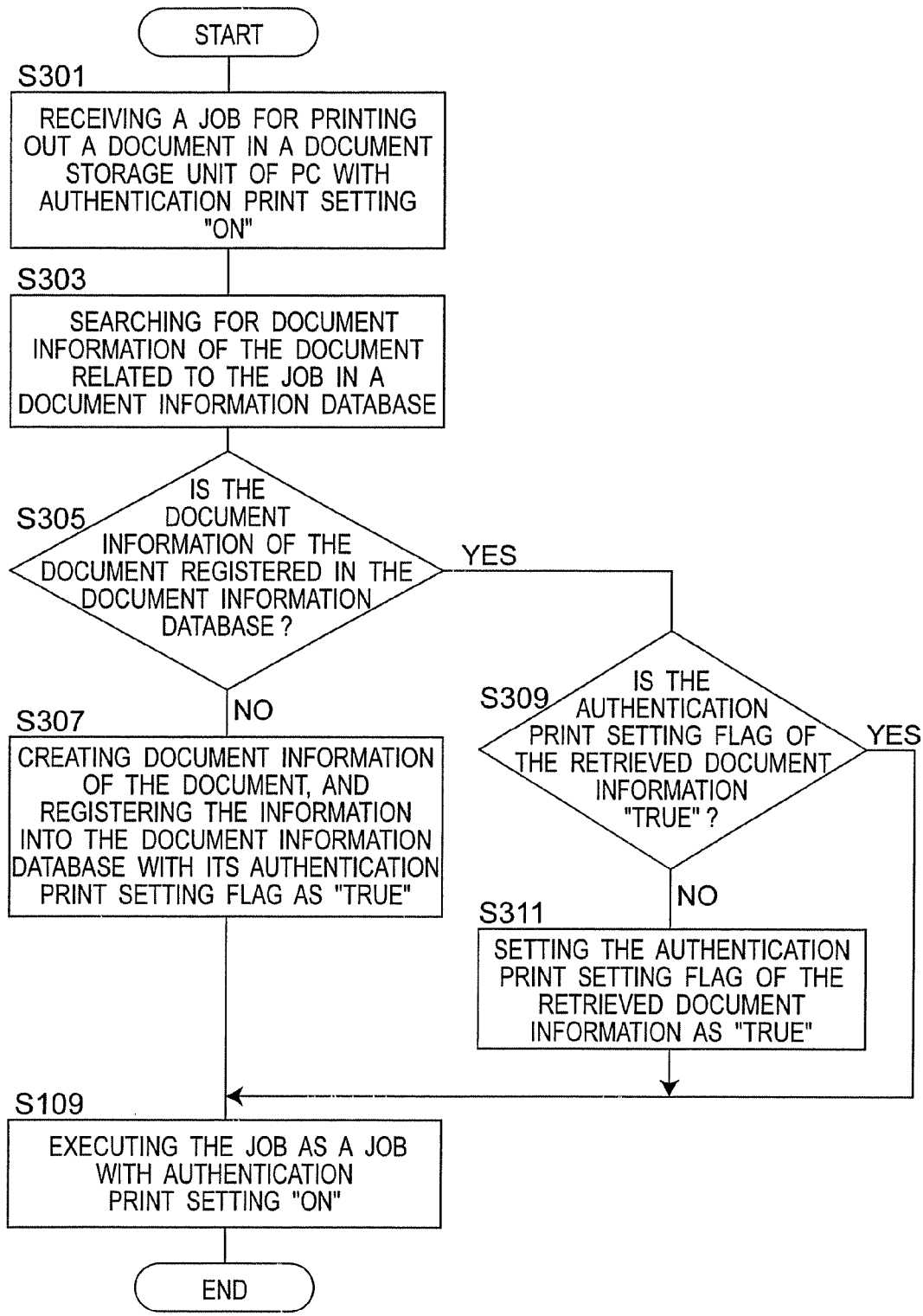
FIG. 10 is a flowchart of process in the image forming device.

FIG. 10 is a flowchart of processes of the MFP 1 in a case where the user selects ON setting for the setting of the authentication print printing at the PC 3, and inputs the job for printing out a document stored in the document storage unit 123 of the PC 3. The document may be a document stored in other than PC 3. This flowchart is a flowchart related to the print job of the document stored in other than the document box 41 of the MFP 1.

In step S301, the authentication print setting determination unit 61 of the MFP 1 receives job data through the communication interface 35.

In step S303, the MFP 1 searches for the document information, which is stored in the document information database 43, of the document specified in the job data. The search is carried out by searching through the document information database 43 with the information of the document related to the job as the search key. The search key may include, for example, attribute information of the document data file, the document data file, and the like. The attribute information of the document data file may include an ID unique to the document data file, file name of the document data file, creator of the document data file, final saver of the document data file, created date and time of the document data file, updated date and time of the document data file, volume of the document data file, and characteristic value of the image data contained in the document data file.

In step S305, the MFP 1 determines whether or not the relevant document is registered in the document information database 43. The process proceeds to step S309 if the relevant document is registered in the document information database 43 ("YES" in step S305). The process proceeds to step S307 if the relevant document is not registered in the document information database 43 ("NO" in step S305).

In step S307, the authentication print setting registering unit 53 of the MFP 1 newly creates a record related to the relevant document in the document information database 43, and records the authentication print setting of the document information of the newly created record as ON setting (record the authentication setting flag as "True").

In step S309, the MFP 1 determines whether the authentication print setting in the document information as to the document in the document information database 43 is recorded as ON setting or as OFF setting. The process proceeds to step S109 if the authentication print setting in the document information as to the document in the document information database 43 is recorded as ON setting ("YES" in step S309). The process proceeds to step S311 if the authentication print setting in the document information as to the document in the document information database 43 is recorded as OFF setting ("NO" in step S309).

In step S311, the authentication print setting registering unit 53 of the MFP 1 again records the authentication print setting in the relevant document information as ON setting (record the authentication print setting flag as "True").

The process in step S109 is the same as step S109 described with reference to FIG. 8.

Figure 11:
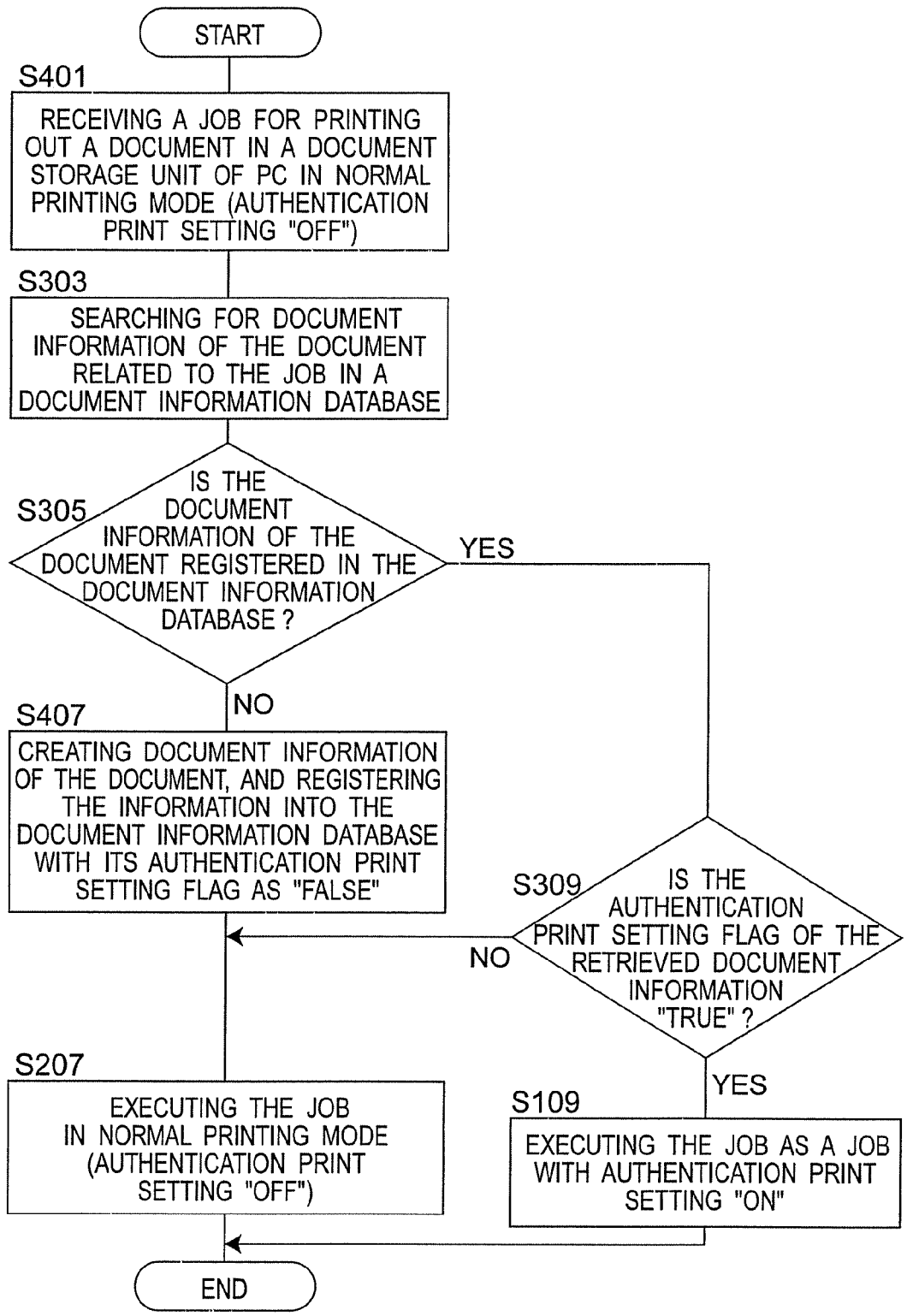
FIG. 11 is a flowchart of process in the image forming device.

FIG. 11 is a flowchart of processes performed by the MFP 1 in a case where the user selects OFF setting for the setting of the authentication print printing at the PC 3, and inputs the job for printing out a document stored in the document storage unit 123 of the PC 3. The document may be a document stored in other than the PC 3. This flowchart is a flowchart related to the print job of the document stored in other than the document box 41 of the MFP 1.

In step S401, the authentication print setting determination unit 61 of the MFP 1 receives job data through the communication interface 35.

Steps S303, S305, and S309 are the same as steps S303, S305, and S309 of FIG. 10.

In step S407, the authentication print setting registering unit 53 of the MFP 1 newly creates a record related to the relevant document in the document information database 43, and records the authentication print setting as to the document information of the newly created record as OFF setting (record the authentication setting flag as "False").

The process of step S109 is the same as step S109 in FIG. 8.

The process of step S207 is the same as step S207 in FIG. 9.

In the image forming device according to the present embodiment, the printing can be executed so that the authentication print printout process is automatically executed as to the print job related to the document previously having output as the authentication print printout process, regardless of the selection of the authentication print setting made by the user.

Thus, the same security level can be maintained even if the awareness on the information security with respect to the same document differs among the users.

Figure 12:
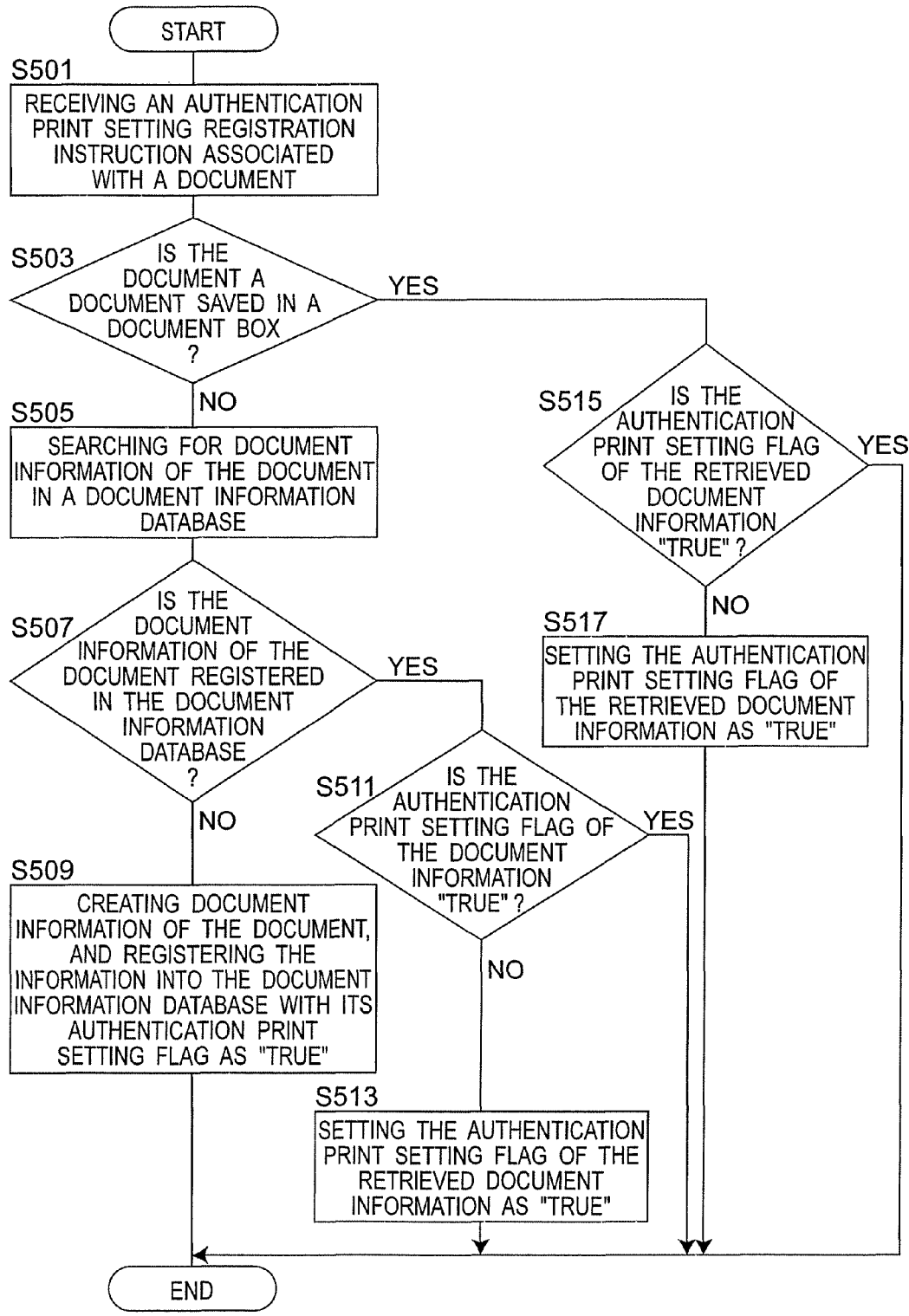
FIG. 12 is a flowchart of process in the image forming device.

Lastly, FIG. 12 is a flowchart of processes of the MFP 1 in a case where the user specifies a document at the PC 3 and transmits the authentication print setting registration data related to this document to the MFP 1.

In step S501, the authentication print setting registering unit 53 of the MFP 1 receives the authentication print setting registration data through the communication interface 35.

In step S503, the MFP 1 determines whether or not the document related to the setting registration data is the document stored in the document box 41. The process proceeds to step S515 if the document is the document stored in the document box 41 ("YES" in step S503). The process proceeds to step S505 if the document is not the document stored in the document box 41 ("NO" in step S503).

In step S505, the MFP 1 searches in the document information database 43 for the document information as to the document related to the setting registration data.

In step S507, the MFP 1 determines whether or not the document information as to the document is registered in the document information database 43. The process proceeds to step S511 if the document information is registered in the document information database 43 ("YES" in step S507). The process proceeds to step S509 if the document information is not registered in the document information database 43 ("NO" in step S507).

In step S509, the authentication print setting registering unit 53 of the MFP 1 newly creates a record related to the relevant document in the document information database 43, and records the authentication print setting of the document information of the newly created record as ON setting (record the authentication setting flag as "True").

In step S511, the MFP 1 determines whether or not the authentication print setting of the document information of the document in the document information database 43 is recorded as ON setting or as OFF setting. The process terminates if the authentication print setting of the document information of the document in the document information database 43 is recorded as ON setting ("YES" in step S511). The process proceeds to step S513 if the authentication print setting of the document information of the document in the document information database 43 is recorded as OFF setting ("NO" in step S511).

In step S513, the authentication print setting registering unit 53 of the MFP 1 again records the authentication print setting of the document information as ON setting (record the authentication print setting flag as "True").

In step S515, the MFP 1 determines whether or not the authentication print setting in the document information as to the document stored in the document box 41 is recorded as ON setting or as OFF setting. The process terminates if the authentication print setting in the document information as to the document stored in the document box 41 is recorded as ON setting ("YES" in step S515). The process proceeds to step S517 if the authentication print setting in the document information as to the document stored in the document box 41 is recorded as OFF setting ("NO" in step S515).

In step S517, the authentication print setting registering unit 53 of the MFP 1 again records the authentication print setting of the document information as ON setting (record the authentication print setting flag as "True").

FIG. 13 is a diagram of a display example of the display 113 of the PC 3.

A list box 141 for enabling the user to select the output method is displayed on the display 113.

In the image forming device terminal according to the present embodiment, an output method that can be selected by the user includes options such as an authentication & print output (authentication print output) 143, a normal printout 141, a security printout 147, a box (document box 41) storing output 149, and registration of authentication & print (authentication print) 151.

When the user selects registration of the authentication & print (authentication print) 151 using the pointer 153, the PC 3 is in a state capable of executing the transmission of the authentication print setting registration data instead of the transmission of the job data.

Therefore, in the image forming device terminal according to the present embodiment, the user can select the authentication print printout when inputting the job for printing out the document. Furthermore, in the image forming device terminal according to the present embodiment, the user can transmit a registration instruction having the printout method in the MFP 1 as an authentication print printout process with respect to an arbitrary document stored in the image forming system 100. Obviously, the transmission of the registration instruction can be performed by any user.

Therefore, in the image forming system according to the present embodiment, the user who does not execute the print job can only register the authentication print setting in the MFP 1 to maintain the security level of the document constant, and according to such feature, the image forming system according to the present embodiment has an effect of maintaining a constant security level on an arbitrary document.

The image forming system according to the present embodiment succeeds in solving the problems of ensuring information security, and enhancing productivity and improving operability of the image forming device at high level.

The image forming device according to the present invention is an image forming device capable of satisfying both excellent productivity and operability, and reliable ensuring of information security at high level.

What is claimed is:

1. An image forming device capable of executing an authentication print printing, which is a printout process of performing user authentication using a predetermined authentication device and determining start of execution of the printout based on a result of the user authentication; the image forming device comprising:

a storage unit that stores a document data file and setting data of the authentication print printing of the document data file;

a communication interface that receives instruction data containing instruction of a process related to the document data file stored in a document box from an image forming device terminal, communicating with the external image forming device terminal;

an authentication print setting determination unit that, when the instruction data contains the printout of the document, determines whether to execute the process instructed by the instruction data as the authentication print printing or a normal printout process based on setting data of the authentication print printing stored in said storage unit;

an authentication unit that is the predetermined authentication device;

a user authentication unit that outputs the result of the user authentication using said authentication unit;

a job executing unit that executes the job related to the instruction data based on the result of the user authentication; and an authentication print setting registration unit that edits the setting data of the authentication print printing stored in the storage unit based on the instruction data, wherein, when the instruction data contains data indicating to turn ON the setting of the authentication print printing, said authentication print setting registration unit edits and turns ON the setting data of the authentication print printing of the document.

2. The image forming device according to claim 1, wherein:

the storage unit stores information related to a document data file stored in a device exterior to the image forming device;

the information related to the document data file stored in the storage unit includes data about setting of the authentication print printing of the document data file, and at least one of attribute information of the document data file and the document data file; and when the instruction data contains data indicating to turn ON the setting of the authentication print printing of the document data file stored in the external device, the authentication print setting registration unit searches for the information related to the document data file stored in the storage unit using at least one of the attribute information of the document data file and the document data file, both of which are contained in the instruction data, as a search key, and edits and turns ON the data of the setting of the authentication print printing of the information related to the document data file stored in the storage unit.

3. The image forming device according to claim 2, wherein the attribute information of the document file includes at least one of:

a unique ID of the document data file;
a file name of the document data file;
a creator of the document data file;
a last saver of the document data file;
a created date and time of the document data file;
an updated date and time of the document data file;
a volume of the document data file; and
characteristic value of image data contained in the document data file.

4. A non-transitory computer readable medium storing an image forming program executed by a computer of an image forming device capable of executing an authentication print printing, which is a printout process of performing user authentication using a predetermined authentication device and determining start of execution of the printout based on a result of the user authentication; the image forming program comprising:

code that stores a document data file and setting data of the authentication print printing of the document data file;

code that communicates with an external image forming device terminal, and receives instruction data containing instruction of a process related to the document data file stored in a document box from the image forming device terminal;

code that determines, when the instruction data contains the printout of the document, whether to execute the process instructed by the instruction data as the authentication print printing or a normal printout process based on the stored setting data of the authentication print printing;

code that outputs the result of the user authentication using an authentication unit which is the predetermined authentication device;

code that executes a job related to the instruction data based on the result of the user authentication; and code that edits the stored setting data of the authentication print printing based on the instruction data, wherein, when the instruction data contains data indicating to turn ON the setting of the authentication print printing, said code that edits the stored setting data edits and turns ON the setting data of the authentication print printing of the document.

5. An image forming device capable of executing a printout of a predetermined document, the printout being switched between an authentication printout and a normal printout in accordance with a selection made at a connected terminal, the authentication printout being a printout process requiring an authentication process for starting printing, the normal printout being a printout process not requiring the authentication process for starting printing, the image forming device comprising:

a storage unit that stores a setting indicating whether the authentication printout is carried out or not for the document, the setting being stored in the storage unit to be associated with the document;

a controlling unit that, in a case where the terminal accepts the selection, in which the authentication printout or the normal printout is selected, executes the authentication printout for the document regardless of whether the authentication printout or the normal printout is selected at the terminal, if the setting indicating that the authentication printout is carried out for the document is stored in the storage unit; and an authentication print setting registration unit that stores the setting indicating that the authentication printout is carried out for the document in the storage unit without accompanying the printout of the document, when the terminal accepts a selection of an authentication print setting registration, in which the setting of the authentication printout for the document is registered without an execution of printout of the document.

\* \* \* \* \*